March 15, 1966  J. BURKHOLDER  3,240,226
SELF-TAPPING SERVICE VALVE FITTING
Filed May 31, 1962
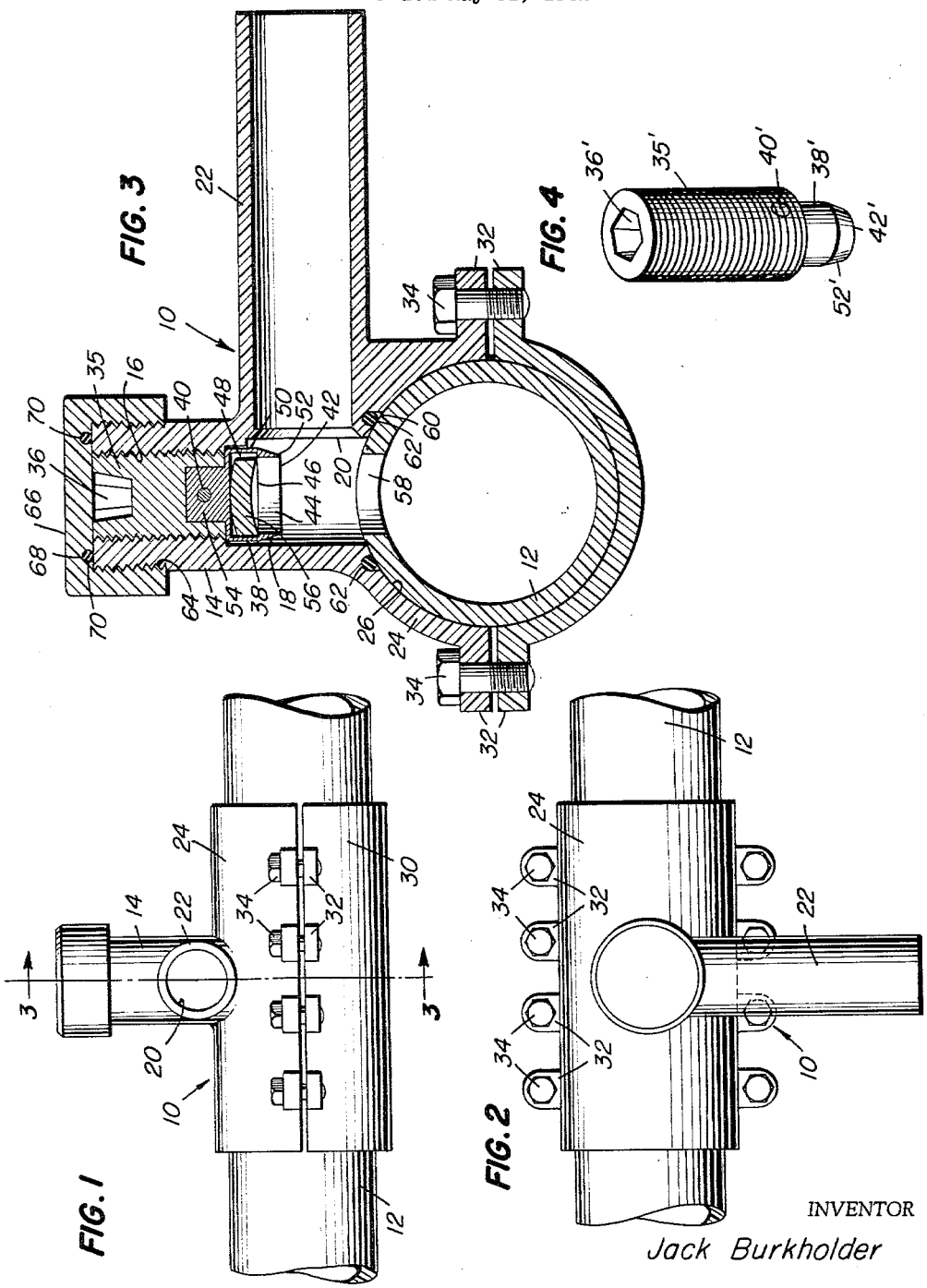
INVENTOR
Jack Burkholder
BY Gustave Miller
ATTORNEY United States Patent Office 3,240,226
Patented Mar. 15, 1966

3,240,226
SELF-TAPPING SERVICE VALVE FITTING
Jack Burkholder, c/o Mid-Atlantic Plastics Corp.,
P.O. Box 1099, Danville, Va.
Filed May 31, 1962, Ser. No. 198,852
4 Claims. (Cl. 137—318)

This invention relates to a self-tapping service valve fitting for plastic mains which is attachable to a plastic main carrying fluid under pressure for connecting a plastic service pipe to the plastic main without permitting escape of the fluid to the atmosphere, whether the fluid be gas or water or any other type of fluid.

Plastic mains, particularly for gas distribution, and plastic service pipes running from such mains into dwellings have relatively recently come into use. The use of such mains involves the problem of connecting service pipes thereto when the main is in service. Obviously, it is desirable to make the connection of a service pipe to a plastic main without any escape of fluid to the atmosphere, and even more desirable when the main carries gas, the escape of which would create a hazardous condition. More recently, the problem has become even more acute, because of the increasing use of higher pressures in plastic gas mains.

Metal or plastic service self-tapping valve fittings for connecting plastic service pipes to plastic mains when the latter are in service have been developed and presented to the trade. Such valve fittings are not entirely satisfactory, however, for various reasons, among which is included appreciable leakage of fluid from the main to the atmosphere during the connecting operation. Although such leakage is relatively small, any leakage of gas whatever obviously creates a potentially hazardous situation. Further, metal or plastic service and tapping valve fittings thus far developed allow chips and cuttings to fall into the main during the operation of tapping the latter. Such debris is highly undesirable in a main, since it may clog valves in the main or enter service lines and clog valves or burners in a dwelling. Additionally, known service valve fittings for attachment to plastic mains have no means for shutoff of fluid flowing therethrough in the event that repairs are necessary to the service lines.

Accordingly, it is an object of this invention to provide an improved service and self-tapping valve fitting for connecting a plastic service pipe to a plastic main without escape of fluid from the main to the atmosphere, even though such main carries fluid under pressure during the connecting operation.

It is still another object of this invention to provide improved service valve fitting with means for shutting off the flow of fluid therethrough at any time.

It is still another object of this invention to provide an improved service and self-tapping valve fitting which positively prevents chips or cuttings from falling into the main during or subsequent to the tapping operation.

It is still another object of this invention to provide an improved service valve fitting with a double seal for the same after the main has been tapped and the connection of the service pipe effected.

Although the cutting knife will be of metal, the remainder, except for the metal bolts and the securing rivet may generally be of appropriate plastic. However, due to its novel construction, the entire fitting may also be of metal and still provide a leakproof connection of the main to the service pipe.

With the above and related objects in view, this invention consists in the details of construction and combination of parts, as will be more fully understood from the following description, when read in conjunction with the accompanying drawings in which:

FIG. 1 is an elevational view of the valve fitting of this invention in position on a main.
FIG. 2 is a top plan view of FIG 1.
FIG. 3 is a sectional view on line 3—3 of FIG. 1.
FIG. 4 is a perspective view of a modified form of the assembled plug and a circular cutting knife, the knife being smaller than the plug.

There is shown at 10 the self-tapping service valve fitting of this invention for providing a valved service fitting on a plastic main 12 for fluids. Plastic mains made of suitable types of plastic material have now become popular for fluids of various types, such as water or gas for homes, as well as other types of fluids elsewhere, and this invention provides means for providing a leakproof service valve fitting which may be added to the main 12 at any desired location without necessity of shutting down the flow of the fluid through the main 12.

The fitting 10 includes a tube 14 having a counterbored through bore consisting of a threaded bore 16 and a larger bore 18, the larger bore 18 having a lateral outlet bore 20 from which extends a lateral outlet tube 22. Integrally and symetrically secured to the tube 14 is the saddle 24 whose inner surface 26 is complementary to the outer surface of the plastic main 12 to which it is to be secured by a second saddle 30, both saddles 24 and 30 having apertured lateral lips 32 through which bolt means such as stud bolts 34 of brass or other suitable metal are secured for clamping the saddles 24 and 30 in embracing relationship about the main 12. Although individual pairs of complementary lips 32 are shown for each stud bolt 34, it is obvious that a single, elongated lip with a plurality of aligned apertures may extend laterally from each straight edge of each saddle 24 and 30, and that, instead of stud bolts and threaded apertures in the lips of one saddle, that bolts and nuts, with unthreaded apertures, may be used, according to the convenience of the manufacturer.

Threaded through the threaded bore 16 is a threaded plug 35 having a tool receiving and cooperating means 36 at its outer end, here shown in the form of a tapered hexagonal indentation for receiving a complementary shaped tool (not shown) for controllably rotating the plug 35. A circular metal cutting knife 38 is secured to the inner end of plug 35 as by a rivet 40 to partake of the rotation of the plug and remain firmly fixed thereto. The cutting edge 42 is in the projection of the inner cylindrical bore 44, the bore 44 being connected by a shoulder 46 to a larger counterbore 48 within the knife 38, the outer cylindrical surface 50 of the knife 38 being inwardly beveled at 52 to the cutting edge 42. As shown in FIG 3, the outer diameter of the circular knife 38 is larger than the diameter of the plug 35, and hence the securing rivet 40 extends through a reduced extension 54 of the circular knife 38. The plug 35 is, of course, threaded into the threaded bore 16 from the inner end of the bore 18 before it is assembled on the main 12.

When the plug 35 is screwed down through the bore 16 by a suitable tool inserted in identation 36, the cutting edge 42 of circular knife 38 will cut a coupon 56 from the main 12 and provide an outlet 58 for the fluid therein. As the cutting operation proceeds, the coupon 56 will enter the bore 44, and when cut through, will be forced further therein by the pressure of the fluid in the main into the counterbore 48 and be trapped and held therein by the shoulder 50. Retraction of the plug 35 will provide the outlet 58 in the main which then connects to the lateral outlet 20 to lateral tube 22. As long as the distance between the retracted knife edge 42 is at least equal to the diameter of the main outlet 58, the knife 38 will not interfere with the flow of fluid from the main 12 to the outlet tube 22.

The main outlet 58 is usually one inch when the main 12 is a water main, but if it is a gas main, a smaller outlet may be desired in the main 12, in which case a plug 35', shown in FIG. 4, having a circular knife 38' with a cutting edge 42' of a suitable diameter is used, as shown, the diameter of such cutting edge 42' may be less than the diameter of the threaded plug 35'. A beveled incline 52' leads to the cutting edge 42', and there is an internal counterbore within the smaller circular knife 38' similar in construction to that shown in the larger cutting knife 38. Obviously, a wide variety of cutting knife diameters may be provided as desired for use in a single size fitting 10, between a diameter substantially less than that of the plug 35' to a diameter larger than that of the plug 35 but not larger than the diameter of the tube counterbore 18.

To insure a leakproof connection from the main outlet 58 to the lateral outlet tube 22, the inner surface 26 of saddle 24 is provided with a seal ring receiving groove 60 in which is placed an O-ring 62 of appropriate diameter to form an effective seal when the bolts 34 are tightened to clamp the fitting 10 on the main 12. In addition, the through bore tube 14 is externally threaded at 64, and a complementary theaded cap 66 is threaded down thereover, the cap 66 having a seal ring receiving groove 68 therein in that part of its inner surface which contacts the annulus of the end of the tube 14, and an O-ring 70 of appropriate diameter and material is placed therein.

The plug 35 will fit reasonably tight in the threaded bore 16 and will prevent any substantial leakage while the coupon 56 is being cut from the main 12 to form the main outlet 58. Then, when the main outlet 58 has been formed and the plug has been retracted, the cap 66 with its sealing ring 70 is placed in position as shown to provide a leakproof connection of the fitting 10 to the main 12.

Should it be necessary at any later time to cut off the flow of fluid from the main 12 to the outlet tube 22 to the service pipe, the cap 66 may be temporarily removed and the plug 35 may then be screwed down so as to cause the cutting knife 38 to enter the main outlet 58 and act as a valve and prevent flow of fluid therethrough, the bevel incline 52 forming an effective valve face, and the cap 66 is replaced. To reopen the main outlet 58, the cap 66 is again removed, the plug 35 is retracted, and the cap 66 is replaced.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

1. A self-tapping service valve fitting for plastic mains comprising a service fitting having a tube having a counterbored through bore and a lateral outlet in the inner, larger bore of said through bore, said fitting having an outlet tube extending from said lateral outlet and an arcuate saddles through which said inner, larger bore of said through bore extends from said through bore tube, said arcuate saddle being complementary to a plastic main to which it is to be secured, an arcuate saddle clamp, means for securing said saddle clamp to said through bore saddle to embrace the plastic main therebetween and secure said fitting to the plastic main, an O-ring receiving groove in said main contacting surface of said through bore saddle about said through bore therethrough, an O-ring in said groove providing an effective seal between said fitting and the plastic main about said through bore, said through bore having an interior thread extending inwardly of the outer, smaller bore thereof, a complementary threaded plug in said threaded outer, smaller bore of said through bore, a circular cutting knife coaxially secured to the inner end of said plug for projecting out of the inlet end of said bore at its inner end for cutting a hole in the main, concentric with said bore, by screwing said plug theretoward, said circular knife having a cylindrical interior surface extending inwardly from its circular cutting edge for receiving and trapping the coupon cut from the main therewithin, said interior cylindrical surface of said circular knife being counterbored, the larger bore thereof being more remote from the circular cutting edge, the outer surface of said cutting knife being beveled toward its cutting edge, said cutting edge being a projection of said interior cylindrical surface, said through bore tube also having an exterior thread extending from its outer end, a complementary threaded cap screwed thereover, said cap having an O-ring receiving groove in its tube end annulus engaging surface, and an O-ring in said cap groove providing an effective seal between said cap and said tube end annulus, said means for securing said through bore saddle and said saddle clamp comprising lips extending laterally from adjacent edges of said through bore saddle and said saddle clamp, said lips having aligned apertures, and bolt means secured through said aligned apertures.

2. The fitting of claim 1, said plug having a tool receiving and engaging means at its outer end comprising an inwardly tapered hexagonal indentation concentric of its outer end.

3. A self-tapping service valve fitting for plastic mains comprising a service fitting having a tube, said tube having a counterbored through bore and a lateral outlet, a lateral tube extending from said lateral outlet, a saddle from which the inner, larger bore of said through bore integrally and symetrically extends, said saddle being complementary to the main to which it is to be secured, said inner, larger bore of said through bore also extending through said saddle, the main contacting surface of said saddle having a seal ring receiving groove about said through bore therethrough, a second saddle complementary to the main, means for clamping said saddles together in main embracing position, a threaded plug threaded in the outer, smaller bore of said through bore, a counterbored circular cutting knife secured at the inner end of, and coaxially with, said threaded plug for cutting a coupon from the main, the larger bore of said knife being more remote from the circular cutting edge, said counterbored knife trapping and retaining the coupon therewithin, thereby providing an outlet bore from the main to said inner larger bore of said through bore, flow communication between said main and said lateral outlet being established when said plug and knife is retracted, a seal ring in said groove providing an effective sealing means between said fitting and the main, a cap threadedly secured on said through bore tube, said plug, knife, and coupon being retained therewithin, and effective O-ring sealing means in the tube end annulus engaging surface of said cap engaged with the end annulus of said through bore tube, both said sealing means providing a leakproof connection between the service main and said lateral outlet tube.

4. The fitting of claim 3, the diameter of said cutting knife being greater than the diameter of said plug.

References Cited by the Examiner
UNITED STATES PATENTS

| | | | |
|---|---|---|---|
| 2,287,354 | 6/1942 | Misch | 77—37 |
| 2,793,830 | 5/1957 | Nakaji | 138—89 X |
| 2,839,075 | 6/1958 | Mueller | 137—318 |
| 2,972,915 | 2/1961 | Milanovits | 77—42 |

FOREIGN PATENTS

| | | |
|---|---|---|
| 1,075,691 | 1954 | France. |
| 837,399 | 1960 | Great Britain. |

ISADOR WEIL, *Primary Examiner.*